S. Colwell.
Iron Structure.
Nº 10,756.              Patented Apr. 11, 1854.
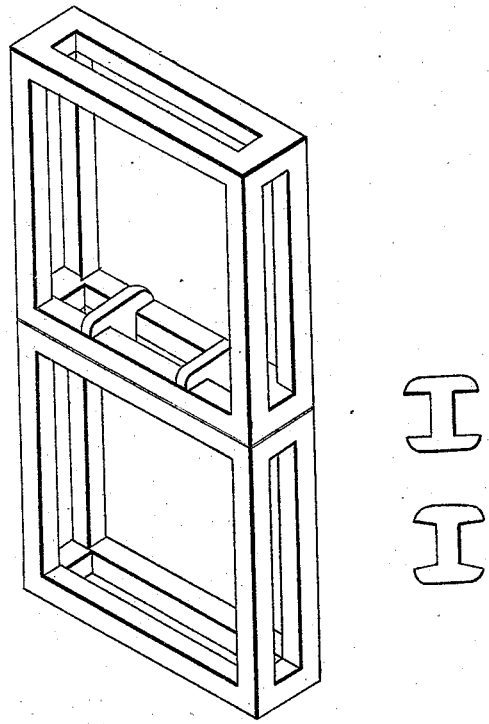

UNITED STATES PATENT OFFICE.

STEPHEN COLWELL, OF PHILADELPHIA, PENNSYLVANIA.

USING IRON FOR BUILDINGS.

Specification of Letters Patent No. 10,756, dated April 11, 1854.

*To all whom it may concern:*

Be it known that I, STEPHEN COLWELL, of Philadelphia, in the county of Philadelphia and State of Pennsylvania, have invented a new Mode of Using Iron in Buildings; and I do hereby declare that the following is a full and exact description thereof, reference being had to the accompanying drawings and to the letters of reference marked thereon.

The nature of my invention consists, 1st, in using a series of hollow cubes or frames, squares, parallelograms, prisms, pentagons, hexagons and other regular or eccentric forms of iron and sections of the same in the erection of buildings of any size or required thickness of wall, the building may demand; 2d, the use of mortar, cement, woolen cloths, paper saturated with cement or any other yielding substance between these cubical frames, previous to the application of the fastenings, to make air-tight joints, to level the pieces, to distribute the pressure, and in the case of the use of cements to produce so much adhesion as to strengthen the building, or if need be, to make the whole quite rigid; 3d, the erection of a skeleton or frame, composed of the aforesaid hollow cubes, or frames of various forms, connected or fastened together by fastenings of wood, iron in the form of bolts, screws, keys, wedges, clamps, pins, long rods or plates of iron, according to the fancy of those using them; said skeleton or main frame to be susceptible of receiving on its exterior or interior surface any covering of metal, wood or plaster, of any style of architecture, and which is susceptible at any future time of being readily removed and replaced with new designs; and including between the exterior and interior surface a body of air as a nonconductor and a protection against extremes of heat and cold; 4th, the cutting out a portion of the iron in the sides of these cubical frames, or frames of other forms, to reduce their weight and allow greater thickness of wall in proportion to the quantity of iron employed, and so as at the same time to make apertures or flues for the escape of gas and smoke and for conducting warm air to any part of the building and facilitating ventilation by introducing air from without and permitting its escape from within, whenever it may be desirable.

To enable others to make and use my invention I will proceed to describe its construction.

I construct hollow cubes or frames, squares, parallelograms, prisms, pentagons, hexagons or other regular or eccentric forms of iron of any size or thickness or any section of the same, the frames being of such proportions and peculiarity of outline as the architecture or requirements of the building may require.

To erect a building I form a skeleton by connecting together frames or pieces of iron, fastening them by fastenings of wood or iron in the form of bolts, screws, keys, wedges, clamps, pins, long rods or plates of iron. Previous to the application of fastenings I place between the aforesaid frames mortar, cement, woolen cloth, or paper saturated with cement, or any other yielding substance, to make air-tight joints to level the pieces, to distribute the pressure and in the case of the use of cements to produce so much adhesion as to strengthen the building or if need be to make the whole quite rigid. The manner in which these frames are constructed and connected together so as to form the skeleton or frame of a building is shown both in elevation and perspective in the accompanying drawings. I adapt the said skeleton for receiving on its exterior or interior surface, and place on the same a covering of metal, wood or plaster, in any style of architecture or ornament which the plan of the building may require, and including between the exterior and interior surface a body of air as a nonconductor. I apply to the exterior or interior surface of said frame or skeleton, the exterior and interior covering in such a manner that it is susceptible at any future time of being readily removed and replaced with new designs. I cut out a portion of the iron in the sides of the frames aforesaid to reduce their weight and allow greater thickness of wall in proportion to the quantity of iron employed and so as at the same time to make apertures or flues for the escape of gas and smoke; and for conducting warm air to any part of the building and to facilitate ventilation by introducing air from without and permitting its escape from within whenever desirable.

What I claim as my invention and im- provement and desire to secure by Letters Patent, is—

The mode of constructing the skeleton walls of buildings of any desired thickness by placing vertically upon each other rectangular frames or hollow squares of cast iron and sections of the same like bricks or blocks of stone, but not breaking joints as in laying brick or stone, the said frames being connected together and leveled substantially as above described; the skeleton wall being separate from the covering of the building, but adapted for receiving on its exterior or interior surface a covering of plates of iron or other suitable material removable at will.

STEPHEN COLWELL.

In presence of—
HERMANN THEINHARDT,
CHAS. D. FREEMAN.